(12) United States Patent
Beeck et al.

(10) Patent No.: US 6,183,199 B1
(45) Date of Patent: Feb. 6, 2001

(54) COOLING-AIR BORE

(75) Inventors: Alexander Beeck, Küssaberg (DE); Bernhard Bonhoff, Baden (CH); Günter Wilfert, Valley (DE)

(73) Assignee: ABB Research Ltd., Zurich (CH)

( * ) Notice: Under 35 U.S.C. 154(b), the term of this patent shall be extended for 0 days.

(21) Appl. No.: 09/271,267

(22) Filed: Mar. 17, 1999

(30) Foreign Application Priority Data

Mar. 23, 1998 (EP) .................................................. 98810253

(51) Int. Cl.$^7$ ...................................................... F01D 5/18
(52) U.S. Cl. ............................................................ 416/97 R
(58) Field of Search ................................... 415/115, 116; 416/97 R, 97 A, 96 R

(56) References Cited

U.S. PATENT DOCUMENTS

| | | |
|---|---|---|
| 3,457,619 | 7/1969 | Kydd . |
| 4,197,443 | 4/1980 | Sidenstick . |
| 4,606,701 * | 8/1986 | McClay et al. ........................ 416/92 |
| 4,705,455 * | 11/1987 | Sahm et al. ........................ 416/97 R |
| 5,183,385 * | 2/1993 | Lee et al. ............................. 416/97 R |
| 5,192,192 * | 3/1993 | Ourhaan ............................. 416/97 R |
| 5,261,789 | 11/1993 | Butts et al. . |
| 5,271,715 | 12/1993 | Zelesky et al. . |
| 5,382,133 | 1/1995 | Moore et al. . |
| 5,779,437 * | 7/1998 | Abdel-Messeh et al. ........... 415/115 |

FOREIGN PATENT DOCUMENTS

0228338B1  7/1987 (EP) .

* cited by examiner

*Primary Examiner*—F. Daniel Lopez
*Assistant Examiner*—Ninh Nguyen
(74) *Attorney, Agent, or Firm*—Burns, Doane, Swecker & Mathis, L.L.P.

(57) ABSTRACT

A cooling wall comprises an outer surface, which is exposed to a hot-gas flow, an inner surface, and at least one film-cooling hole within the wall, which film-cooling hole has a diffuser section and an outlet at the outer surface. The diffuser section has first and second internal surfaces, the intersection edge between the first internal surface and the outer surface forming an upstream edge of the outlet, and the intersection edge between the second internal surface and the outer surface forming a downstream edge of the outlet. The diffuser section has side surfaces, which faces one another, connect the first and second internal surfaces and diverge from one another toward the outlet of the diffuser section. The first internal surface of the diffuser section is rounded toward the axis of the film-cooling hole.

21 Claims, 5 Drawing Sheets

Fig. 4
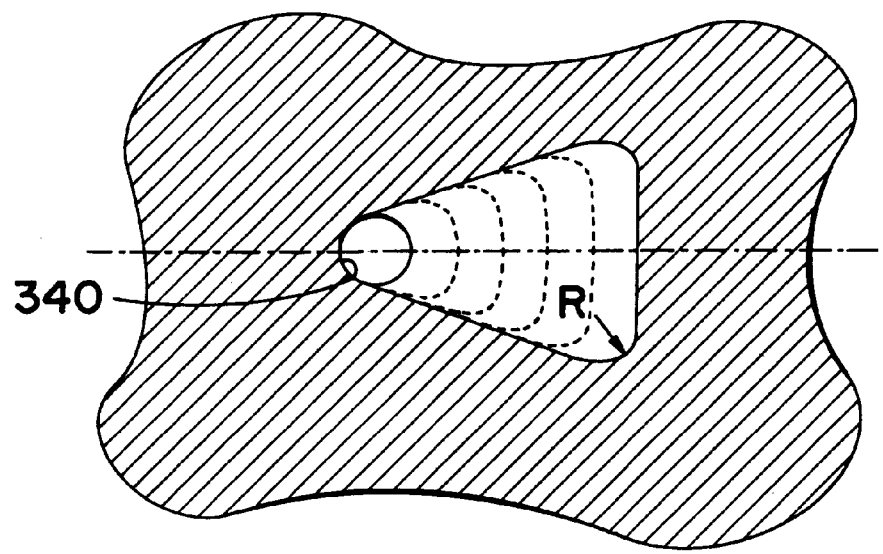
340
R
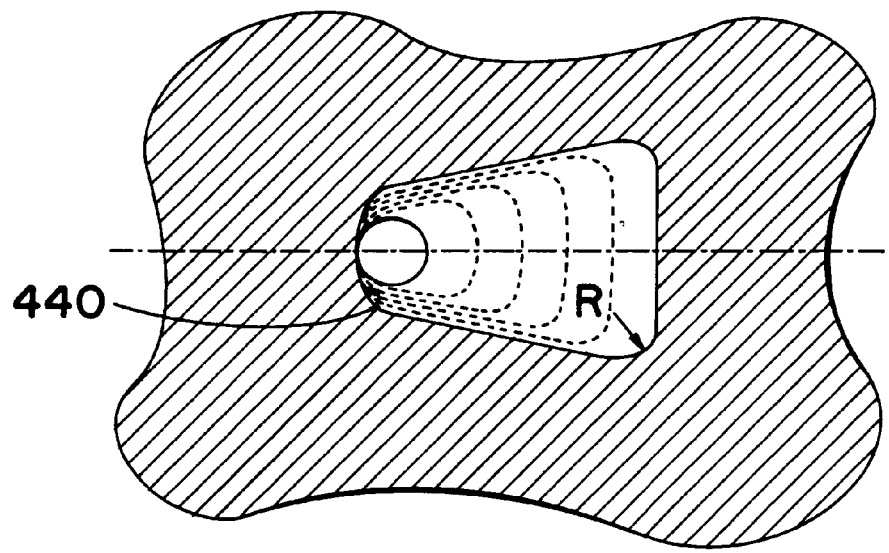
440
R
Fig. 5

COOLING-AIR BORE

BACKGROUND OF THE INVENTION

1. Field of the Invention

The invention relates to a cooled wall having cooling-air bores, in particular film-cooling bores.

2. Discussion of Background

To increase the output and the efficiency, increasingly higher turbine inlet temperatures are being used in modern gas-turbine plants. In order to protect the turbine blades from the increased hot-gas temperatures, they must be intensively cooled. At correspondingly high inlet temperatures, purely convective cooling is no longer sufficient. The film-cooling method is therefore often used. In this case, the turbine blades are protected from the hot gas by a cooling film. To this end, openings, for example bores, through which the cooling air is blown out, are made in the blades.

In order to achieve as high a cooling effect as possible, the cooling air which is blown out must be deflected as rapidly as possible and flow in a protective manner along the profile surface. In order to also protect the zones lying between the bores, rapid lateral spreading of the cooling air is also necessary. This may be achieved by the cooling-air bores having a diffuser, which on account of the lateral widening permits a wider area of the surface to be covered. To further improve the mixing behavior, geometrical diffuser forms in which the bore is widened not only laterally but also on the downstream side of the bore are used. The blow-out rates in the case of these geometrical diffuser forms are small, so that there is little risk of the cooling air passing through the flow boundary layer. The cooling efficiency can therefore be increased considerably compared with a cylindrical bore.

Publication U.S. Pat. No. 4,197,443 discloses a spark-erosion electrode with which holes which widen in the lateral and longitudinal directions can be made in airfoils.

Publication EP-B-228 338 describes a cooled wall having a cooling-medium passage which has a dosing section and a diffuser section. The diffuser section contains a plane surface in the downstream and upstream directions respectively. Two side surfaces diverge from one another toward the cooling-medium outlet.

Experience shows that malfunctions repeatedly occur during the operation of a gas turbine, and these malfunctions may lead to parts of the machine becoming detached, being transported through the turbine and causing damage in the process. The regions having considerable flow deflection are most affected by the impact of foreign bodies. The foreign bodies generally have a higher specific density than the hot gas flowing through the machine. Consequently, the foreign bodies are deflected to a less pronounced degree at these locations and strike a wall. Typical impact locations are found, for instance, in the region of the leading edge on the suction side of turbine blades. If the foreign bodies strike those locations of the blade at which cooling bores are made, there is the risk in the case of the hitherto known geometrical diffuser forms that the hole cross section will be reduced or even completely closed. As a result, the cooling effect is greatly reduced. With the tight design limits normal nowadays, this may lead to the maximum permissible material temperatures being exceeded, which drastically reduces the service life of the blade.

SUMMARY OF THE INVENTION

Accordingly, one object of the invention is to provide a novel cooled wall which is provided with an arrangement of cooling bores which have improved stability and reliability with considerable cooling effectiveness. This object is achieved by the cooled wall of independent claim 1. Further advantageous and expedient refinements follow from the dependent claims, the description and the drawings.

A cooled wall of the generic type comprises an outer surface, which is exposed to a hot-gas flow, which flows along the outer surface in the downstream direction, an inner surface, preferably for forming part of a cooling-medium chamber for receiving preferably pressurized cooling medium, and at least one film-cooling hole within the wall, which film-cooling hole has a diffuser section and an outlet at the outer surface. In this case, the axis of the film-cooling hole is directed in such a way that a cooling-medium flow from the outlet is directed in such a way that it has a velocity component in the downstream direction of the hot gas. The diffuser section has a first internal surface at a distance from a second internal surface, the first and second internal surfaces intersecting the outer surface of the wall. At the same time, the intersection edge between the first internal surface and the outer surface forms an upstream edge of the outlet, and the intersection edge between the second internal surface and the outer surface forms a downstream edge of the outlet. Furthermore, the diffuser section has side surfaces, which face one another, connect the first and second internal surfaces and diverge from one another toward the outlet of the diffuser section. According to the invention, the first internal surface of the diffuser section is designed in such a way that it is rounded toward the axis of the film-cooling hole.

FIGS. 2(a), (b) show a known geometrical diffuser form having a lateral widened portion, and FIGS. 3(a), (b) show a known geometrical diffuser form having an additional downstream widened portion of the film-cooling hole. It has now been found that such cooling bores are especially susceptible to the impact of foreign bodies at the upstream outlet edge (reference numeral W). The wall is very thin there and is easily pressed downward by the impact of foreign bodies. The cross section of the cooling bore is thereby reduced; in the extreme case, the bore is even completely closed.

The rigidity of the edge is markedly increased by the first internal surface of the diffuser section being rounded off according to the invention toward the axis of the cooling bore, since the forces which are produced during the impact of a foreign body are laterally deflected into a zone of greater wall thickness.

The stability of such a film-cooling hole according to the invention is lower than that of a cylindrical hole but is markedly higher than that of conventional non-circular holes. On the other hand, the cooling characteristics are clearly superior to those of cylindrical holes; they are virtually not reduced compared with the conventional geometrical diffuser forms (FIGS. 2 and 3).

The first internal surface of the diffuser section is preferably rounded in an elliptical manner, particularly preferably in a circular manner. The specification of the curve shape relates here to a section of the hole having a plane parallel to the outer surface. In particular, in the case of circular or elliptical rounding of the internal surface, the intersection edge between the internal surface and the outer surface will thus itself be circular or elliptical. The radius of curvature may vary along the axis of the film-cooling hole and then merges continuously from the curvature at the inlet of the diffuser section to the curvature at the outer surface.

Parabolic or hyperbolic rounding-off or the configuration of the rounding-off of the internal surface with the use of two or more compound curves is also expedient.

The first internal surface is preferably designed in such a way that it merges in a smooth curve into the side surfaces. The second internal surface is advantageously essentially plane and likewise merges advantageously in a smooth curve into the side surfaces.

The first and second internal surfaces advantageously diverge from one another toward the outlet of the diffuser section at an angle of less than 30°, preferably at an angle of between 5° and 20°. Furthermore, it is advantageous if at least one of the side surfaces diverges from the axis of the film-cooling hole at an angle of greater than 5°, preferably greater than 10°. In an especially advantageous manner, both side surfaces diverge from the axis at such an angle. The axis of each film-cooling hole advantageously encloses with the outer surface an angle of between 5° and 50°, preferably between 15° and 40°, particularly preferably between 25° and 35°.

In a further refinement of the invention, each film-cooling hole has a feed section, the feed section having an inlet at the inner surface, and the outlet of the feed section forming the inlet of the diffuser section. The feed section preferably has a constant cross section, particularly preferably a constant elliptical cross section, between its inlet and its outlet. However, it is also within the scope of the invention for the cross section of the feed section not to remain constant but to increase toward the diffuser section, for instance by means of a step or an area having a different slope.

In a refinement of the invention, the cooled wall is the outer wall of a hollow-profile body, in particular of a gas-turbine blade.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1b shows a partial view of the cooled wall in direction 1b—1b of FIG. 1a;

FIG. 2b shows a partial view of the cooled wall in direction 2b—2b of FIG. 2a;

FIG. 3b shows a partial view of the cooled wall in direction 3b—3b of FIG. 3a;

FIGS. 4–7 each show a view like FIG. 1 corresponding to further exemplary embodiments of the invention.

Only the elements essential for the understanding of the invention are shown. Not shown, for example, are the complete hollow-profile body and the entire arrangement of the cooling bores. The direction of flow of the working medium is designated by arrows.

DESCRIPTION OF THE PREFERRED EMBODIMENTS

Figure 1A:
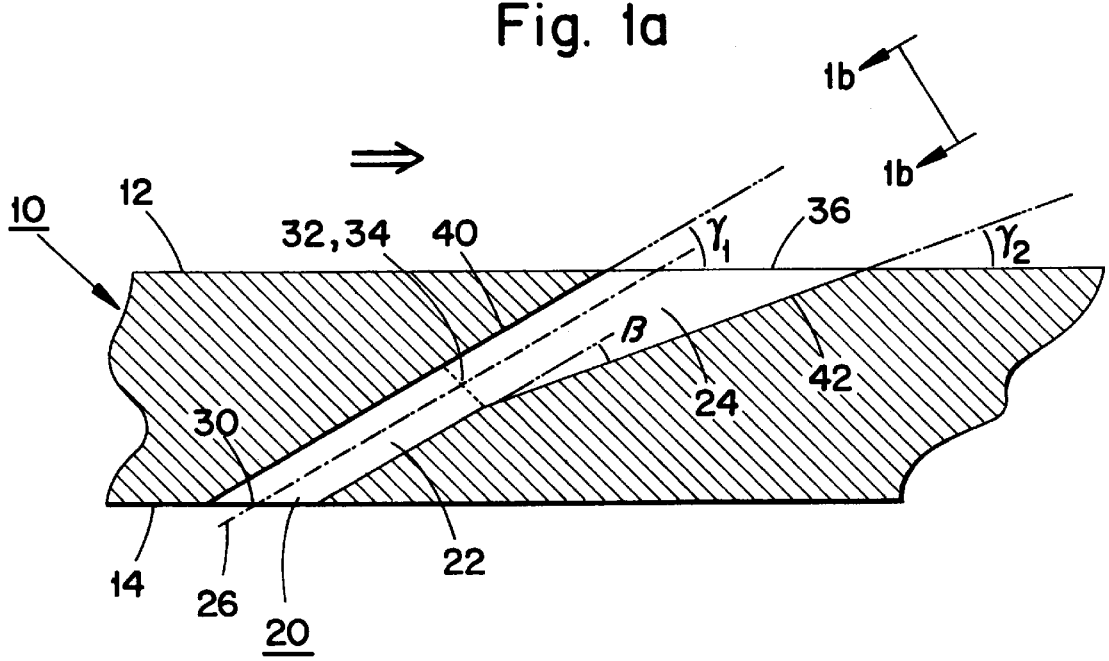
FIG. 1a shows a cross section through a cooled wall with a film-cooling hole according to the invention.

Referring now to the drawings, wherein like reference numerals designate identical or corresponding parts throughout the several views, FIG. 1(a) shows a cross section through a wall 10 of a hollow-profile body of a gas-turbine blade having a film-cooling hole 20 according to the invention. The film-cooling hole 20 extends from the inner surface 14 to the outer surface 12 of the wall 10. Hot gas flows along the outer surface 12 in the direction of the arrow. The inner surface 14 is the boundary surface of a cooling-medium chamber, which contains pressurized cooling air. On the cooling-chamber side, the film-cooling hole has a cylindrical feed section 22, whose cross section at the inlet 30 determines the cooling-air quantity flowing through.

Figure 1B:
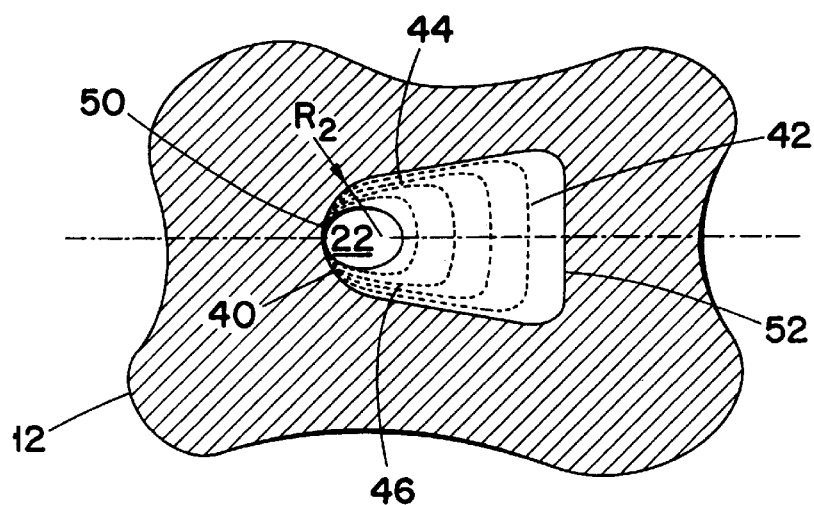

From the outlet 32 of the feed section 22, the cooling air flows into the diffuser section 24. The diffuser section 24 has two internal surfaces 40, 42, which are at a distance from one another and, in the exemplary embodiment of FIG. 1a, diverge from one another at an angle of $\beta=10°$. In the side view of FIG. 1(a), the intersection edge of the first internal surface 40 is parallel to the axis 26 of the film-cooling hole 20. In this exemplary embodiment, the axis 26 emerges at an angle of 30° at the outer surface 12. The internal surfaces 40, 42 therefore form with the outer surface 12 the angles $\gamma_1=30°$ and $\gamma_2=20°$ respectively. The intersection edges between the internal surfaces 40, 42 and the outer surface are designated by the reference numerals 50 and 52 respectively. As can be seen in FIG. 1b, the diffuser section also has side surfaces 44 and 46, which intersect the internal surfaces 40, 42. Both side surfaces 44, 46 diverge from the axis 26 of the film-cooling hole toward the outlet 36 of the diffuser section.

Lateral spreading of the cooling air is thereby achieved, as a result of which a protective cooling-air film is provided on the outer surface 12 even between the individual film-cooling holes 20.

The cooling-air flow is rapidly deflected by the diffuser in the direction of flow of the hot gas, so that the cooling air which is blown out comes into contact with the profile surface as a protective film. In this case, the blow-out rates are small, so that there is little risk of the cooling air passing through the flow boundary layer.

The internal surface 40 is rounded in a circular manner toward the axis 26 of the film-cooling hole 20. At the intersection edge 50, the intersection between the internal surface 40 and the outer surface 12, the radius of curvature is $R_2$. In this exemplary embodiment, the feed section 22 is designed to be cylindrical with a constant cross section. In this exemplary embodiment, the outlet 32 of the feed section coincides with the inlet 34 of the diffuser section 24. The radius of curvature of the first internal surface 40 at the inlet 34 of the diffuser section is therefore determined by the cylindrical feed section. Its value at this location is thus d/2, d designating the diameter of the cylindrical section. Between the inlet 34 and outlet 36 of the diffuser section, the radius of curvature of the internal surface 40 increases steadily and continuously from d/2 to $R_2$. The second internal surface 42 is essentially plane and, at the lines of intersection with the side surfaces 44, 46, merges into the latter in a smooth curve having a radius of curvature R.

Figure 2A:
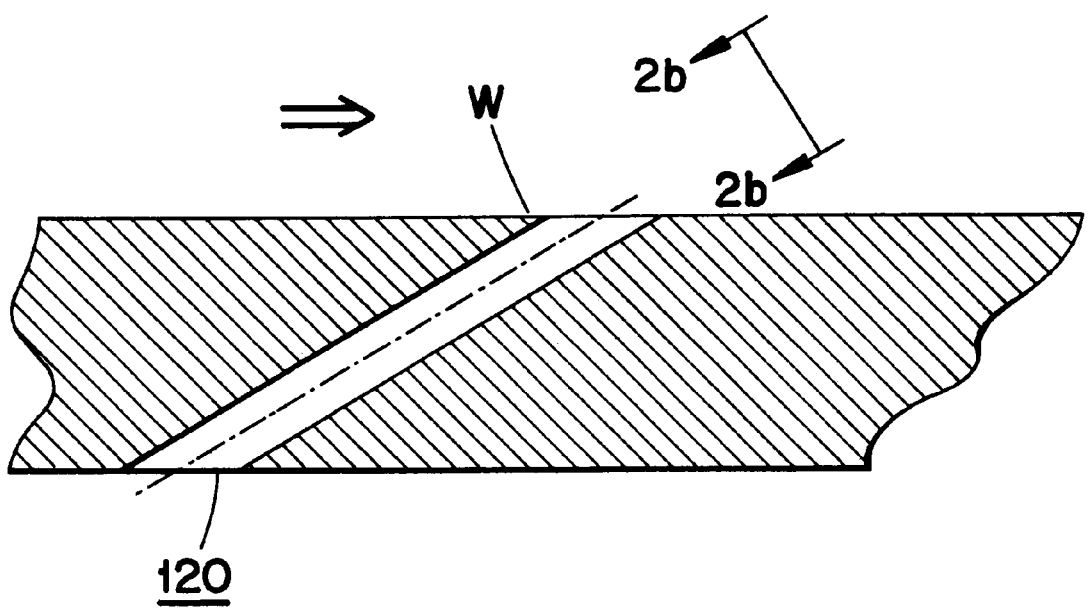
FIG. 2a shows a cross section through a cooled wall with a film-cooling hole having a lateral widened portion according to the prior art.
Figure 2B:
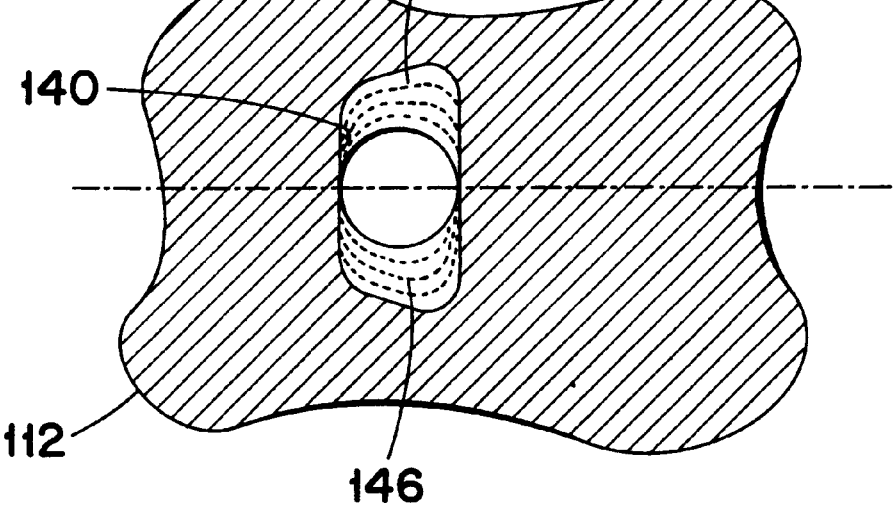
Figure 3A:
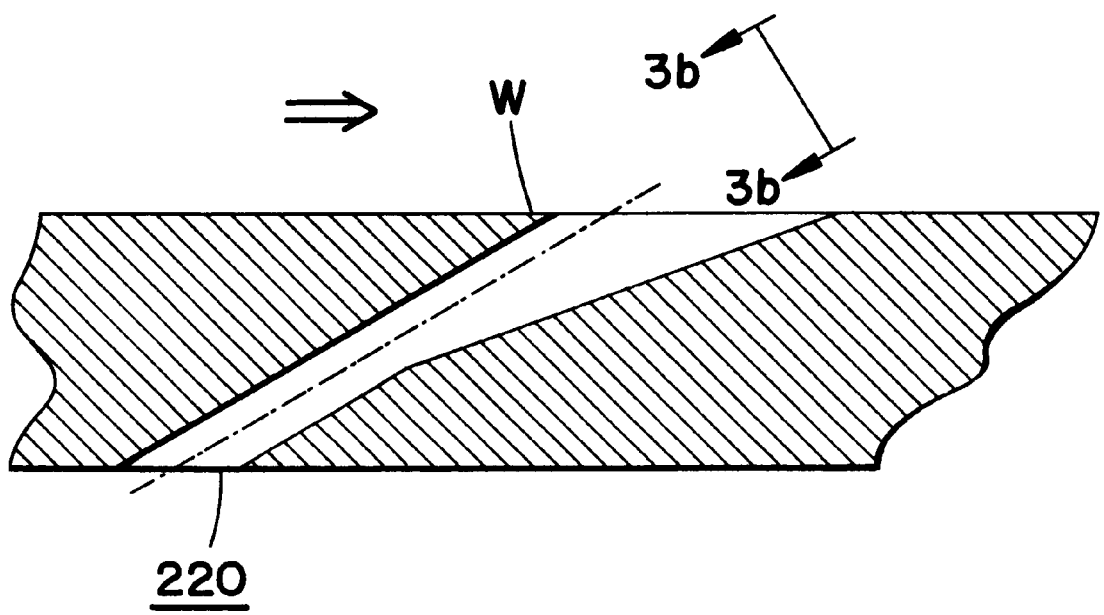
FIG. 3a shows a cross section through a cooled wall with a film-cooling hole having a lateral and downstream widened portion according to the prior art.
Figure 3B:
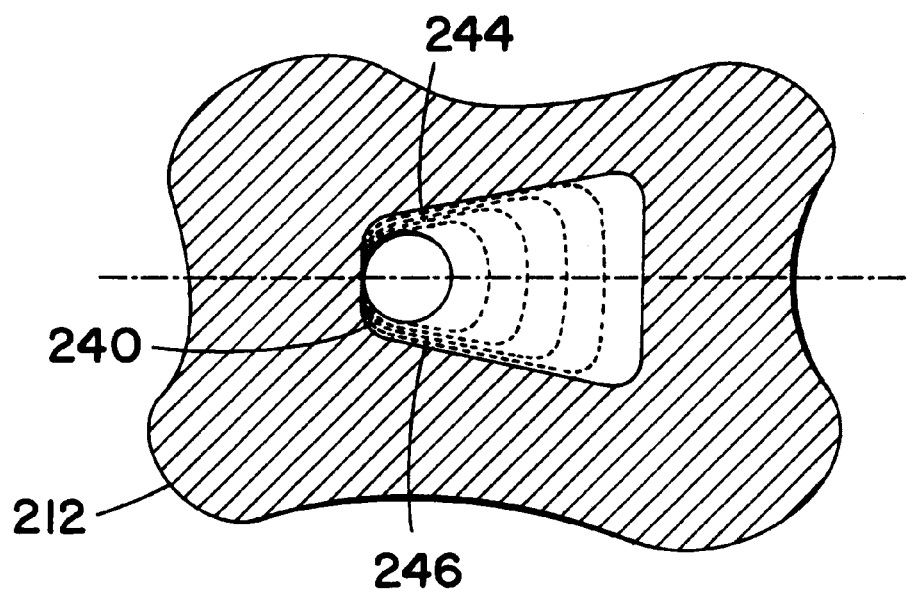

In known solutions (FIGS. 2(b), 3(b)), the first internal surfaces 140, 240 are of plane design. In the cases shown in FIGS. 2(b) and 3(b), although they merge in a smooth curve into the side surfaces 144, 146 and 244, 246 respectively, a plane segment of considerable size always remains. In the vicinity of the edges 150 and 250 respectively, the wall thickness is especially small (designation W in FIGS. 2(a), 3(a)) and is thus susceptible to impact by foreign bodies. The rigidity of this region is significantly increased by the rounding-off of the first internal surface 40 in the invention, since the forces produced during the impact are deflected laterally into regions of greater wall thickness. In addition, due to the rounding-off, the critical region of the outer surface 12 under which regions of very small wall thickness are located is markedly reduced compared with the known designs.

Furthermore, to achieve maximum cooling effectiveness, the edge 52 is of non-circular design. However, this does not have an adverse effect on the stability of the hole, since the wall has virtually its maximum thickness at the edge 52. The stability of the film-cooling hole 20 of FIG. 1 therefore approaches the stability of cylindrical cooling holes. However, due to the fact that the ratio of diffuser opening to feed opening has hardly changed, the cooling characteristics are far superior to a cylindrical hole.

If the smallest possible value is selected for the radius $R_2$ ($R_2=d/2$), the radius of curvature of the first internal surface 340 along the axis of the film-cooling hole is constant (FIG. 4). The stability of such a film-cooling hole virtually corresponds to that of a cylindrical hole of diameter d; however, it has far superior cooling characteristics.

In a further embodiment (FIG. 5), the first internal surface 440 is rounded in an elliptical manner, i.e. the cross sections of the film-cooling hole with planes parallel to the outer surface each exhibit an elliptical curve as the intersection edge. Although to a lesser extent than in the case of circular rounding-off, this configuration also leads to a noticeable increase in the stability. The use of other conic sections, for instance parabolic or hyperbolic rounding-off, also lead to increased stability.

Figure 6:
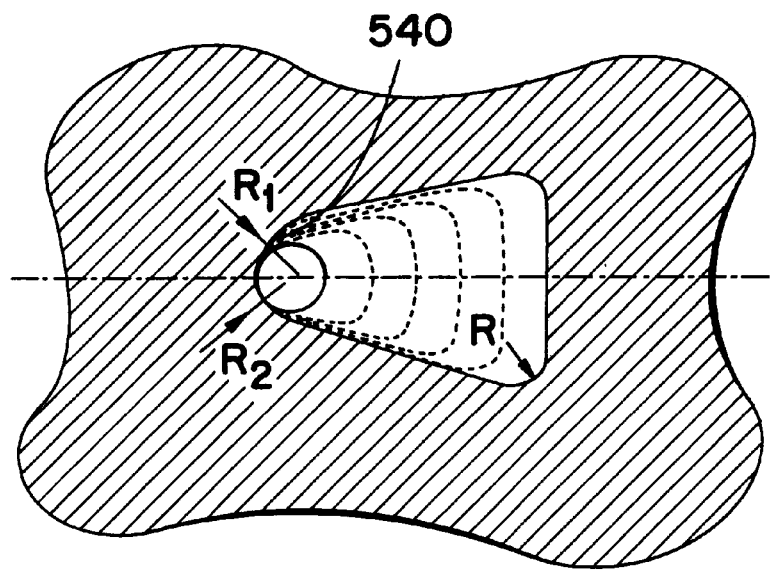
Figure 7:
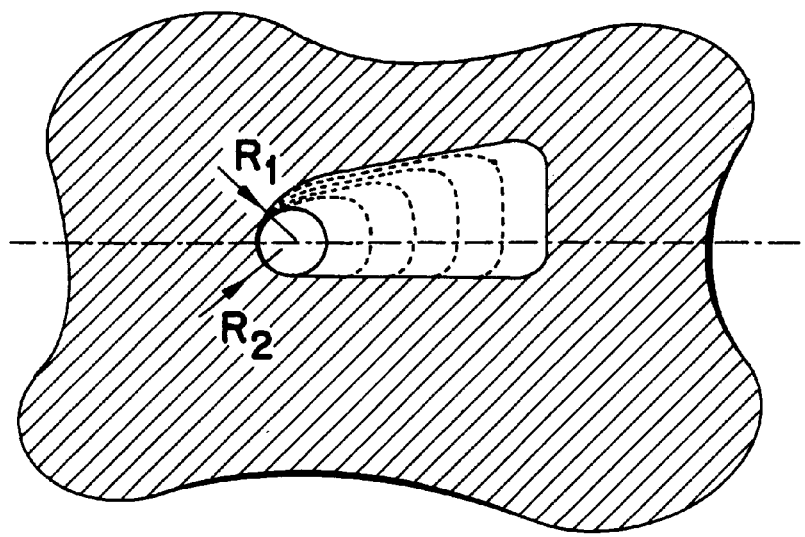

Shown in FIG. 6 is an embodiment in which the first internal surface 540 is rounded by the use of two compound curves of different radii $R_1$, $R_2$. Such an embodiment is especially expedient when the axis of the film-cooling holes has an additional lateral angle relative to the hot-gas flow. In some situations, it is advantageous to laterally widen the film-cooling holes only to one side. In such a case, too, the use of two compound curves of different radii for the widened side and the non-widened side is expedient (FIG. 7).

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A cooled wall having an outer surface, which is exposed to a hot-gas flow, which flows along the outer surface (12) in the downstream direction, an inner surface, and at least one film-cooling hole has a diffuser section and an outlet at the outer surface, the axis of the film-cooling hole being directed in such a way that a cooling-medium flow from the outlet is directed in such a way that it has a velocity component in the downstream direction, the diffuser section having a first internal surface, which is rounded in the form of at least two compound curves, at a distance from a second internal surface, the first and second internal surfaces intersecting the outer surface of the wall, and the intersection edge between the first internal surface and the outer surface forming an upstream edge of the outlet, and the intersection edge between the second internal surface and the outer surface forming a downstream edge of the outlet, the diffuser section having side surface, which face one another, connect the first and second internal surfaces and diverge from one another toward the outlet of the diffuse section, wherein the first internal surface of the diffuser section is rounded toward the axis of the film-cooling hole.

2. The cooled wall as claimed in claim 1, in which the first internal surface is rounded in an elliptical manner.

3. The cooled wall as claimed in claim 1, in which the first internal surface (40) is rounded parabolically.

4. The cooled wall as claimed in claim 1, in which the first internal surface (40) merges in a smooth curve into the side surfaces (44, 46).

5. The cooled wall as claimed in claim 1, in which the first and second internal surfaces (40, 42) diverge from one another toward the outlet (36) of the diffuser section (24) at an angle of less than 30°, preferably at an angle of between 5° and 20°.

6. The cooled wall as claimed in claim 1, in which at least one and preferably both of the side surfaces (44, 46) diverge from the axis (26) of the film-cooling hole (20) at an angle of greater than 5°, preferably greater than 10°.

7. The cooled wall as claimed in claim 1, in which the axis (26) of each film-cooling hole (20) encloses with the outer surface (12) an angle of between 5° and 50°, preferably between 15° and 40°, particularly preferably between 25° and 35°.

8. The cooled wall as claimed in claim 1, in which each film-cooling hole (20) has a feed section (22), the feed section (22) having an inlet (30) at the inner surface (14), and the outlet (32) of the feed section (22) forming the inlet (34) of the diffuser section (24).

9. The cooled wall as claimed in claim 8, in which the feed section (22) has a constant cross section, preferably a constant elliptical cross section, between its inlet (30) and its outlet (32).

10. The cooled wall as claimed in claim 1, in which the wall (10) is the outer wall of a hollow-profile body, in particular of a gas-turbine blade.

11. A cooled wall having an outer surface, which is exposed to a hot-gas flow, which flows along the outer surface in the downstream direction, an inner surface, and at least one film-cooling hole has a diffuser section and an outlet at the outer surface, the axis of the film-cooling hole being directed in such a way that a cooling-medium flow from the outlet is directed in such a way that it has a velocity component in the downstream direction, the diffuser section having a first internal surface at a distance from a second internal surface, the second internal surface being essentially plane and merging in a smooth curve into the side surfaces, the first and second internal surfaces intersecting the outer surface of the wall, and the intersection edge between the first internal surface and the outer surface forming an upstream edge of the outlet, and the intersection edge between the second internal surface and the outer surface forming a downstream edge of the outlet, the side surfaces of the diffuser section, which face one another, connect the first and second internal surfaces and diverge from one another toward the outlet of the diffuse section, wherein the first internal surface of the diffuser section is rounded toward the axis of the film-cooling hole which the second internal surface is essentially plane.

12. The cooled wall as claimed in claim 11, in which the second internal surface merges in a smooth curve into the surfaces.

13. The cooled wall as claimed in claim 11, in which the first internal surface is rounded in an elliptical manner.

14. The cooled wall as claimed in claim 11, in which the first internal surface is rounded parabolically.

15. The cooled wall as claimed in claim 11, in which the first internal surface merges in a smooth curve into the side surfaces.

16. The cooled wall as claimed in claim 11, in which the first and second internal surface diverge from one another toward the outlet of the diffuser section at an angle of less than 30°.

17. The cooled wall as claimed in claim 11, in which at least one and preferably both of the side surfaces diverge form the axis of the film-cooling hole at an angle of greater than 5°.

18. The cooled wall as claimed in claim 11, in which the axis of each film-cooling hole encloses with the outer surface an angle of between 5° and 50°.

19. The cooled was as claimed in claim 11, in which each film-cooling hole has a feed section, the feed section having an inlet at the inner surface, and the outlet of the feed section forming the inlet of the difusser section.

20. The cooled wall as claimed in claim 19, in which the feed section has a constant cross section, preferably a constant elliptical cross section, between its inlet and its outlet.

21. The cooled wall as claimed in claim 11, in which the wall is the outer wall of a hollow-profile body, in particular of a gas-turbine blade.

* * * * *